(12) United States Patent
Matsuda

(10) Patent No.: US 11,819,961 B2
(45) Date of Patent: Nov. 21, 2023

(54) STICKING DETECTION DEVICE AND ARC WELDING ROBOT SYSTEM

(71) Applicant: FANUC CORPORATION, Yamanashi (JP)

(72) Inventor: Yuuichi Matsuda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 440 days.

(21) Appl. No.: 17/073,715

(22) Filed: Oct. 19, 2020

(65) Prior Publication Data
US 2021/0138571 A1    May 13, 2021

(30) Foreign Application Priority Data
Nov. 11, 2019 (JP) .................... 2019-204015

(51) Int. Cl.
*B23K 9/10* (2006.01)
*B25J 19/02* (2006.01)
*B23K 37/02* (2006.01)

(52) U.S. Cl.
CPC ............. *B23K 9/1062* (2013.01); *B25J 19/02* (2013.01); *B23K 37/0229* (2013.01)

(58) Field of Classification Search
CPC .............. B23K 37/0229; B23K 9/0956; B23K 9/1062; B23K 9/173; B23K 9/1006; B23K 37/0258; B25J 19/02; B25J 19/066; G05B 19/0428; G05B 2219/24182
USPC ....................................... 219/130.01
See application file for complete search history.

(56) References Cited

U.S. PATENT DOCUMENTS 7,960,672 B2 * 6/2011 Nishimura ............. B23K 9/173
219/130.21

FOREIGN PATENT DOCUMENTS

| CN | 101327542 A | 12/2008 |
|---|---|---|
| JP | S63-093476 A | 4/1988 |
| JP | H05-245638 A | 9/1993 |

* cited by examiner

*Primary Examiner* — Dana Ross
*Assistant Examiner* — James F Sims, III
(74) *Attorney, Agent, or Firm* — Studebaker & Brackett PC

(57) ABSTRACT

A sticking detection device for detecting the presence or absence of sticking of a welding wire disposed in an arc welding robot to a workpiece includes a first sticking detection unit and a second sticking detection unit. The first sticking detection unit detects the presence or absence of sticking based on a voltage value detected with respect to voltage being applied to the welding wire and the workpiece. The second sticking detection unit determines the presence or absence of sticking based on the voltage value and a result of the detection by the first sticking detection unit.

5 Claims, 4 Drawing Sheets

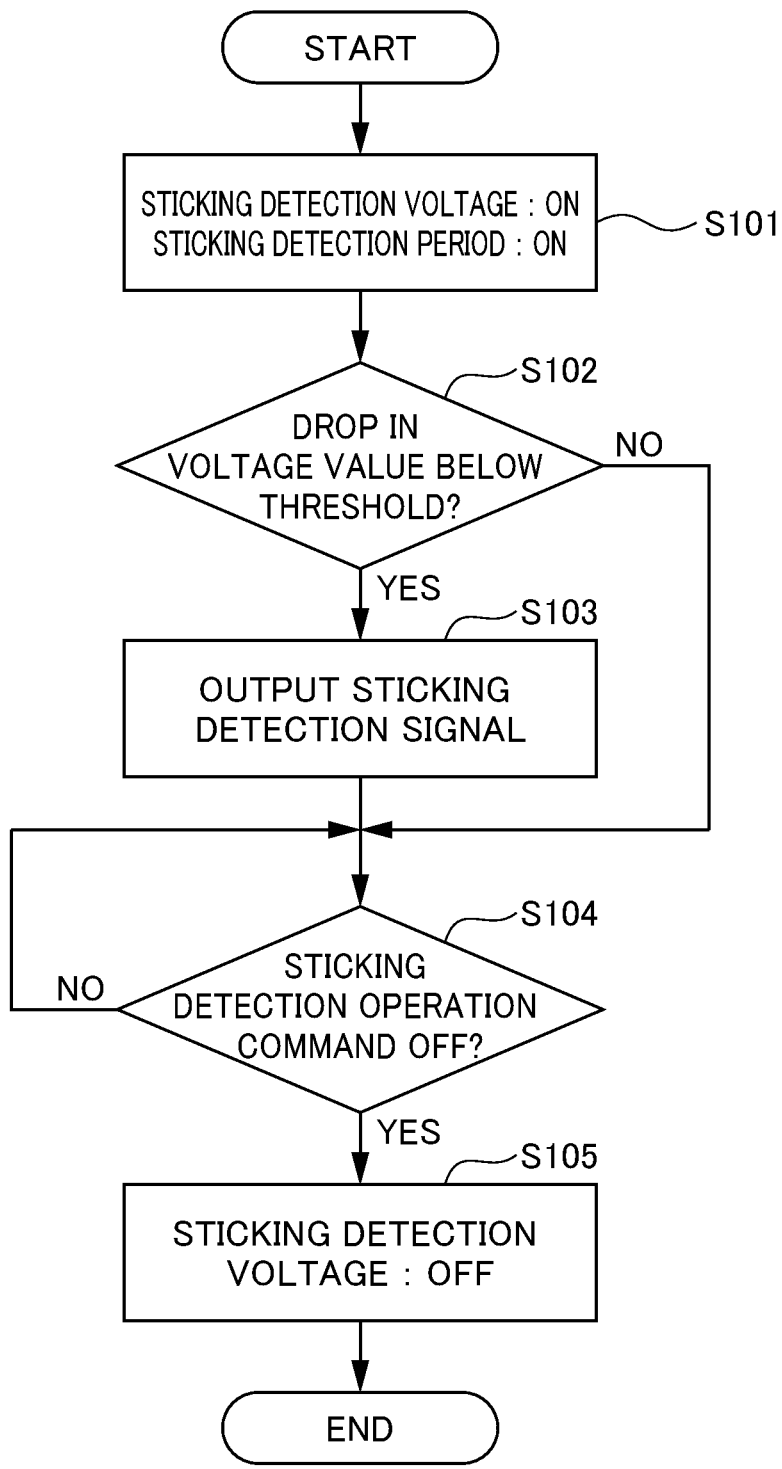

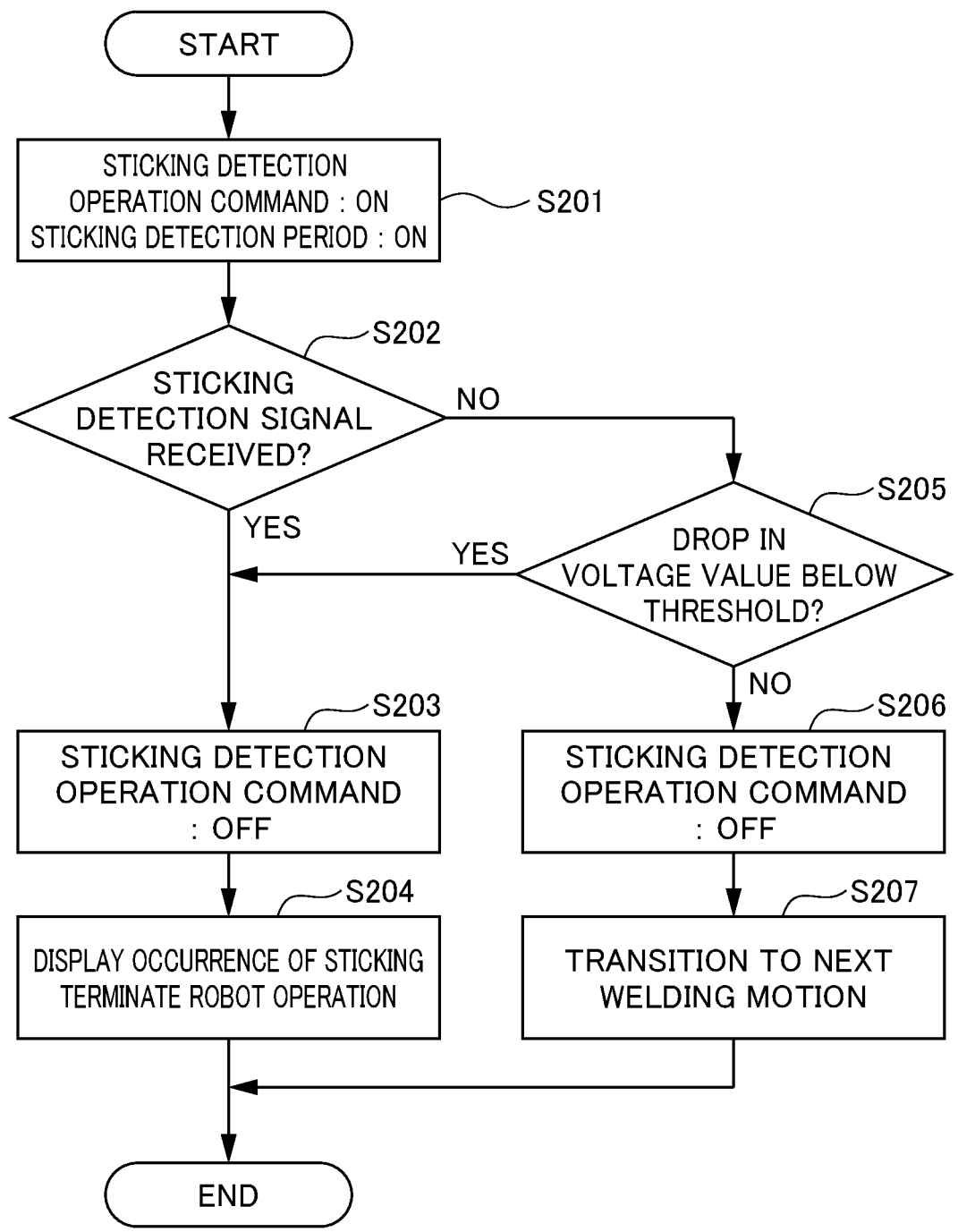

STICKING DETECTION DEVICE AND ARC WELDING ROBOT SYSTEM

This application is based on and claims the benefit of priority from Japanese Patent Application No. 2019-204015, filed on 11 Nov. 2019, the content of which is incorporated herein by reference.

BACKGROUND OF THE INVENTION

Field of the Invention

The present disclosure relates to a sticking detection device and an arc welding robot system.

Related Art

Arc welding is a welding process involving applying welding voltage between a welding wire supported by a welding torch and a workpiece being a welding base material from a welding power supply to generate an arc, and thus melting the welding wire. In a case where the arc welding is performed through a robot motion, the welding wire is separated from the workpiece and is moved toward a next welding spot of the workpiece by a motion of an arc welding robot once welding on one welding spot of the workpiece is completed.

When moving the welding wire after welding is completed, the arc welding robot can experience a phenomenon referred to as "sticking", in which a melted metal (welding beads) fused to the workpiece through the welding and an end of the welding wire remain joined. If the arc welding robot moves with the welding wire sticking to the workpiece, the welding torch can be damaged due to interference between the welding torch and the welding wire. A conventional technique therefore determines the presence or absence of sticking of the welding wire to the workpiece by applying constant voltage between the welding wire and the workpiece after the welding is completed and measuring a value of the voltage using a sticking detection circuit (see, for example, Japanese Unexamined Patent Application, Publication, No. H5-245638).

Patent Document 1: Japanese Unexamined Patent Application, Publication No. H5-245638

SUMMARY OF THE INVENTION

In general, the welding wire is connected to a positive (+) electrode of the welding power supply, and the workpiece is connected to a negative (−) electrode of the welding power supply. The sticking detection circuit monitors a voltage value of sticking detection voltage (for example, 20 V) being applied between the welding wire and the workpiece in determination of the presence or absence of sticking. In the presence of sticking of the welding wire to the workpiece, the voltage value decreases to close to 0 V because the welding wire is grounded through the workpiece. Upon detecting a decrease in the voltage value to close to 0 V, the sticking detection circuit transmits a sticking detection signal to a robot controller. By contrast, in the absence of sticking of the welding wire to the workpiece, the voltage value does not change because the welding wire and the workpiece are separated from each other. Accordingly, the sticking detection circuit does not transmit a sticking detection signal to the robot controller. If the robot controller receives the sticking detection signal from the sticking detection circuit, the robot controller determines the "presence of sticking" and terminates the robot motion. If the sticking detection signal is not received within a predetermined sticking detection period, the robot controller determines the "absence of sticking" and causes the arc welding robot to transition to the next welding motion.

However, since the robot controller relies solely on the presence or absence of the sticking detection signal from the sticking detection circuit to determine the presence or absence of sticking, there is a reliability issue in the sticking detection. That is, in a situation in which the sticking detection signal is not successfully transmitted due to a failure in the sticking detection circuit although sticking is actually occurring, for example, the robot controller can determine the "absence of sticking" and cause the arc welding robot to transition to the next welding motion while leaving the welding wire sticking to the workpiece. It is therefore desired to make the determination of the presence or absence of sticking of the welding wire to the workpiece more reliable.

An aspect of the present disclosure is directed to a sticking detection device for detecting the presence or absence of sticking of a welding wire disposed in an arc welding robot to a workpiece. The sticking detection device includes a first sticking detection unit and a second sticking detection unit. The first sticking detection unit detects the presence or absence of sticking based on a voltage value detected with respect to voltage being applied to the welding wire and the workpiece. The second sticking detection unit determines the presence or absence of sticking based on the voltage value and a result of the detection by the first sticking detection unit.

Another aspect of the present disclosure is directed to an arc welding robot system including an arc welding robot having a welding wire, a robot controller, a welding power supply, and a sticking detection device. The robot controller controls the arc welding robot. The welding power supply applies voltage between the welding wire and a workpiece. The sticking detection device detects the presence or absence of sticking of the welding wire to the workpiece. The sticking detection device has a first sticking detection unit and a second sticking detection unit. The first sticking detection unit detects the presence or absence of sticking based on a voltage value detected with respect to the voltage being applied to the welding wire and the workpiece. The second sticking detection unit determines the presence or absence of sticking based on the voltage value and a result of the detection by the first sticking detection unit.

According to an aspect of the present disclosure, it is possible to determine the presence or absence of sticking of a welding wire to a workpiece more reliably in arc welding.

BRIEF DESCRIPTION OF THE DRAWINGS

FIG. 4 is a flowchart showing operation of the welding power supply in the arc welding robot system according to the embodiment during sticking detection; and FIG. 5 is a flowchart showing operation of the robot controller in the arc welding robot system according to the embodiment during the sticking detection.

DETAILED DESCRIPTION OF THE INVENTION

Figure 1:
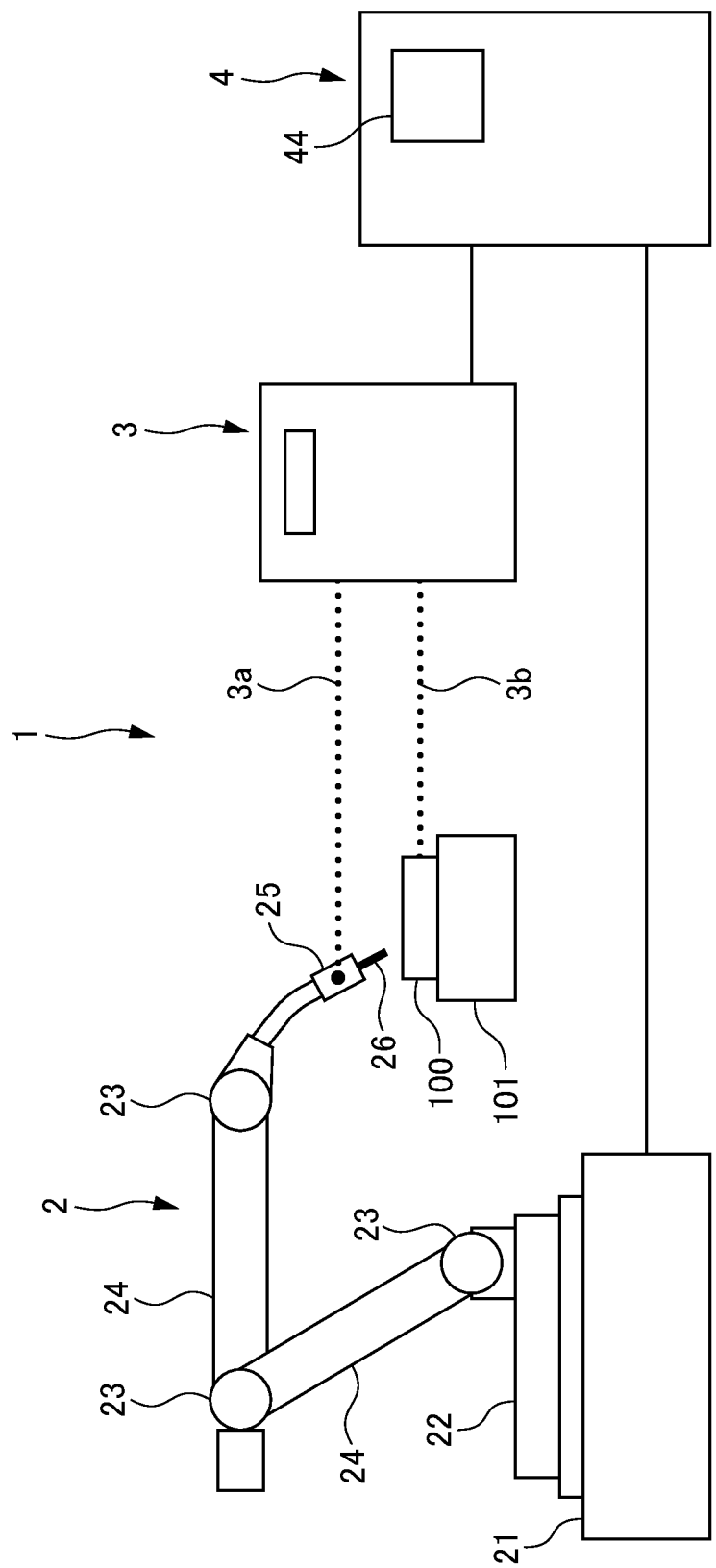
FIG. 1 is a schematic view of an arc welding robot system according to an embodiment.
Figure 2:
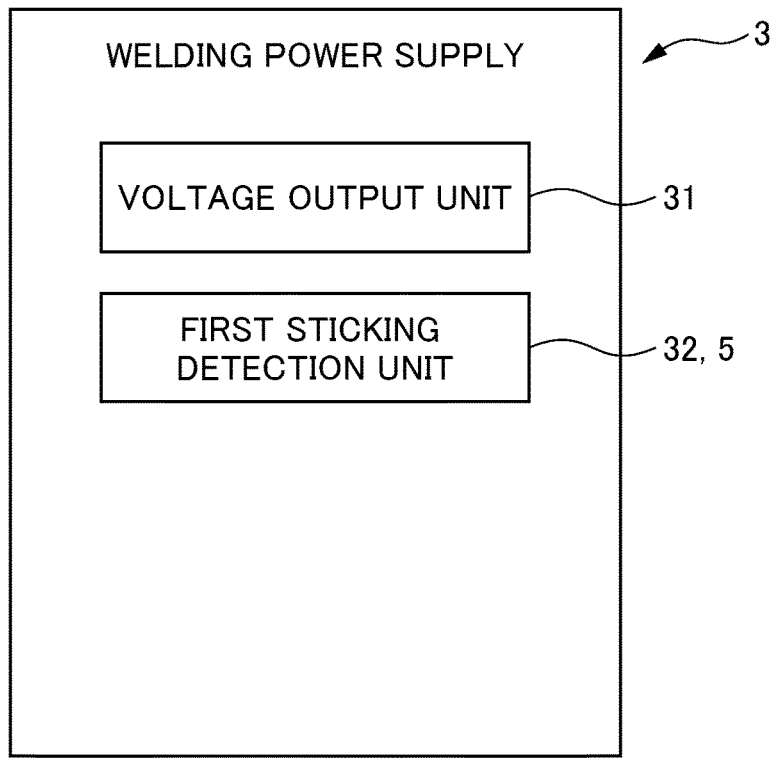
FIG. 2 is a functional block diagram of a welding power supply in the arc welding robot system according to the embodiment.
Figure 3:
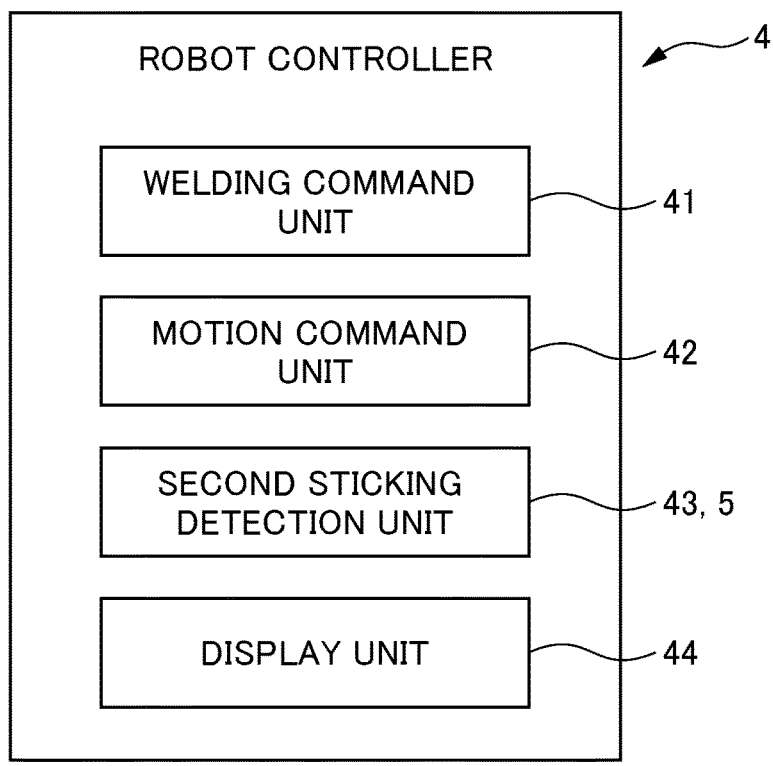
FIG. 3 is a functional block diagram of a robot controller in the arc welding robot system according to the embodiment.

The following describes embodiments of the present disclosure in detail with reference to the accompanying drawings. FIG. 1 is a schematic view of an arc welding robot system according to an embodiment. FIG. 2 is a functional block diagram of a welding power supply in the arc welding robot system according to the embodiment. FIG. 3 is a functional block diagram of a robot controller in the arc welding robot system according to the embodiment.

An arc welding robot system 1 is able to automatically execute a welding motion to move a welding torch 25 along a predetermined welding path to perform arc welding on a workpiece 100 being a welding base material supported on a workpiece support 101. The arc welding robot system 1 according to the present embodiment includes an arc welding robot 2, a welding power supply 3 that applies voltage to a welding wire 26 described below, and a robot controller 4 that controls the arc welding robot 2. The welding power supply 3 and the robot controller 4 are electrically connected to each other and are enabled to exchange signals therebetween through signal lines.

The arc welding robot 2 is an articulated robot having a plurality of arm parts 24 pivotably coupled together by a plurality of joints 23 including servomotors and the like. The arc welding robot 2 is disposed on a base 21 with a turntable 22 therebetween. The welding torch 25 is attached to an end of one arm part 24. The arc welding robot 2 is able to change, as directed, the position and the orientation of the welding torch 25 relative to the workpiece 100 by turning the turntable 22 and the joints 23.

The welding torch 25 supports the welding wire 26 fed thereto from outside the arc welding robot 2 such that the welding wire 26 protrudes by a predetermined length from a tip end of the welding torch 25. The welding wire 26 is electrically connected to a positive (+) electrode of the welding power supply 3 via a conductor 3a. The workpiece 100 is electrically connected to a negative (−) electrode of the welding power supply 3 via a conductor 3b.

The welding power supply 3 supplies welding voltage and sticking detection voltage to the welding wire 26 of the arc welding robot 2 and the workpiece 100 through the conductors 3a and 3b. The welding power supply 3 also performs part of a sticking detection operation. As illustrated in FIG. 2, the welding power supply 3 according to the present embodiment has at least a voltage output unit 31 and a first sticking detection unit 32.

The voltage output unit 31 has at least the following three functions: first, second, and third functions. The first function is a function of applying the welding voltage to the welding wire 26 and the workpiece 100 based on a welding operation command signal received from the robot controller 4. The second function is a function of applying the sticking detection voltage to the welding wire 26 and the workpiece 100 based on a sticking detection operation command signal received from the robot controller 4. The third function is a function of detecting the sticking detection voltage being applied to the welding wire 26 and the workpiece 100, monitoring a voltage value of the detected sticking detection voltage, and transmitting information of the voltage value to the first sticking detection unit 32 and a second sticking detection unit 43 of the robot controller 4.

The welding voltage is applied to the welding wire 26 and the workpiece 100 only while the welding power supply 3 is receiving the welding operation command signal. The sticking detection voltage is applied to the welding wire 26 and the workpiece 100 only while the welding power supply 3 is receiving the sticking detection operation command signal.

The first sticking detection unit 32 has at least a function of performing a predetermined sticking detection operation based on the sticking detection operation command signal received from the robot controller 4 and transmitting a sticking detection signal indicating the presence of sticking to the second sticking detection unit 43 upon detecting the presence of sticking. The sticking detection operation that is performed by the first sticking detection unit 32 is similar to the operation that is performed by the conventional sticking detection circuit. That is, the first sticking detection unit 32 detects the presence or absence of sticking by monitoring the voltage value of the sticking detection voltage and determining whether or not the voltage value has dropped below a threshold.

The robot controller 4 performs overall control of motion of the arc welding robot 2. As illustrated in FIG. 3, the robot controller 4 according to the present embodiment has at least a welding command unit 41, a motion command unit 42, the second sticking detection unit 43, and a display unit 44.

The welding command unit 41 has at least a function of transmitting, to the welding power supply 3, a welding command signal that directs the welding power supply 3 to apply the welding voltage for arc welding to the welding wire 26 and the workpiece 100. Upon receiving the welding command signal, the welding power supply 3 applies the welding voltage to the welding wire 26 and the workpiece 100 through the conductors 3a and 3b.

The motion command unit 42 has at least a function of transmitting, to the arc welding robot 2, a robot motion command signal that causes the arc welding robot 2 to perform a robot motion for arc welding and a function of transmitting, to the welding power supply 3, the sticking detection operation command signal for sticking detection. Upon receiving the robot operation command signal, the arc welding robot 2 performs a robot motion such as a welding motion to move the welding torch 25 along a predetermined welding path. Upon receiving the sticking detection operation command signal, the welding power supply 3 applies the sticking detection voltage to the welding wire 26 and the workpiece 100 through the conductors 3a and 3b.

The second sticking detection unit 43 has a function of determining the presence or absence of sticking based on the presence or absence of the sticking detection signal received as a result of the detection by the first sticking detection unit 32 and the voltage value of the sticking detection voltage received from the welding power supply 3. The determination of the presence or absence of sticking by the second sticking detection unit 43 is a final determination of the presence or absence of sticking in the arc welding robot system 1. Upon making a final determination of the presence or absence of sticking, the second sticking detection unit 43 transmits a signal indicating termination of the sticking detection operation to the welding power supply 3.

Upon determining the "absence of sticking", the second sticking detection unit 43 transmits, to the motion command unit 42, a signal indicating transition to a next welding motion. In response, the motion command unit 42 transmits a robot motion command signal to the arc welding robot 2 to cause the arc welding robot 2 to perform a robot motion to transition to the next welding motion. Upon determining the "presence of sticking", the second sticking detection unit 43 transmits, to the motion command unit 42, a signal indicating termination of the robot motion. In response, the motion command unit 42 terminates the robot motion of the arc welding robot 2.

The display unit 44 displays various information related to robot motion of the arc welding robot 2, results of the determination of the presence or absence of sticking, warning information such as a system error warning, and the like in a viewable manner to an operator. In general, the display unit 44 includes a display device such as a liquid crystal display and is provided on a surface of a casing of the robot controller 4. The display unit 44 may further have a function of displaying audio using a speaker.

The first sticking detection unit 32 provided in the welding power supply 3 and the second sticking detection unit 43 provided in the robot controller 4 constitute a sticking detection device 5 in the arc welding robot system 1 according to the present embodiment. That is, the sticking detection device 5 according to the present embodiment has a constitution in which the first sticking detection unit 32 and the second sticking detection unit 43 disposed separately in the welding power supply 3 and the robot controller 4 are electrically connected to each other via the signal lines. This allows a sticking detection process to be duplicated, so that even if a problem occurs in one of the first sticking detection unit 32 and the second sticking detection unit 43, the other sticking detection unit can detect sticking.

The following describes the sticking detection operation in the arc welding robot system 1 in detail with reference to FIGS. 4 and 5. FIG. 4 is a flowchart illustrating operation of the welding power supply in the arc welding robot system according to the present embodiment during the sticking detection. FIG. 5 is a flowchart illustrating operation of the robot controller in the arc welding robot system according to the present embodiment during the sticking detection.

As illustrated in FIG. 4, the sticking detection operation starts in response to the motion command unit 42 of the robot controller 4 transmitting a sticking detection operation command signal (sticking detection operation command: ON) to the welding power supply 3 after the arc welding robot 2 has completed welding on one welding spot of the workpiece 100. Upon receiving the sticking detection operation command signal, the welding power supply 3 applies, by means of the voltage output unit 31, a predetermined sticking detection voltage to the welding wire 26 and the workpiece 100 (sticking detection voltage: ON). The sticking detection voltage is, for example, 20 V. At the same time, the welding power supply 3 starts, by means of the first sticking detection unit 32, a timer, not shown, for setting a predetermined sticking detection period (sticking detection period: ON) to start counting the sticking detection period (S101). The sticking detection period is, for example, 1 second.

While the sticking detection voltage is applied to the welding wire 26 and the workpiece 100, the voltage output unit 31 detects the voltage value of the sticking detection voltage being applied to the welding wire 26 and the workpiece 100. The first sticking detection unit 32 monitors the voltage value and compares the voltage value with a predetermined threshold. Based on the comparison, the first sticking detection unit 32 determines whether or not the voltage value has dropped below the threshold (S102). The threshold is set to a value slightly greater than a value close to 0 V, which is a voltage value to be detected when sticking actually occurs.

When sticking occurs, the welding wire 26 is grounded through the workpiece 100, and consequently the voltage value decreases to close to 0 V, dropping below the threshold. Upon detecting a drop in the voltage value below the threshold within the sticking detection period, the first sticking detection unit 32 transmits a sticking detection signal indicating the presence of sticking to the robot controller 4 (S103).

After the sticking detection signal has been transmitted, the operation of the welding power supply 3 remains on standby until a signal indicating termination of the sticking detection operation (sticking detection operation command: OFF) is received from the robot controller 4 (S104). After receiving this signal, the welding power supply 3 stops the application of the sticking detection voltage by means of the voltage output unit 31 (sticking detection voltage: OFF), and thus terminates the sticking detection operation (S105).

If a drop in the voltage value below the threshold is not detected before the sticking detection period is over at Step S102, the welding power supply 3 transitions to a process at Step S104 without transmitting a sticking detection signal from the first sticking detection unit 32 to the robot controller 4.

In the robot controller 4, as illustrated in FIG. 5, the motion command unit 42 transmits a sticking detection operation command signal (sticking detection operation command: ON) to the welding power supply 3, and at the same time, the second sticking detection unit 43 starts a timer, not shown, for setting the sticking detection period (for example, 1 second) as in the case of the first sticking detection unit 32 (sticking detection period: ON) to start counting the sticking detection period (3201).

During this period, the second sticking detection unit 43 monitors the voltage value of the sticking detection voltage transmitted from the welding power supply 3 and compares the voltage value with a predetermined threshold. The threshold that is set for the second sticking detection unit 43 may be equal to the threshold that is set for the first sticking detection unit 32. The timer of the second sticking detection unit 43 is in synchronization with the timer of the first sticking detection unit 32. In another constitution, a timer for counting the sticking detection period may be provided in only one of the first sticking detection unit 32 and the second sticking detection unit 43, and the timer may be commonly used to count the sticking detection period for both the first sticking detection unit 32 and the second sticking detection unit 43.

After the start of the sticking detection operation, the second sticking detection unit 43 determines whether or not a sticking detection signal has been received from the first sticking detection unit 32 within the sticking detection period (S202). Upon receiving a sticking detection signal within the sticking detection period, the second sticking detection unit 43 immediately determines the "presence of sticking". Upon the second sticking detection unit 43 determining the "presence of sticking", the robot controller 4 transmits, by means of the motion command unit 42, a signal indicating termination of the sticking detection operation (sticking detection operation command: OFF) to the welding power supply 3 (S203).

Thereafter, the robot controller 4 displays information indicating the occurrence of sticking by means of the display unit 44 and terminates the robot motion by means of the motion command unit 42 (S204). Thereafter, the sticking detection operation by the second sticking detection unit 43 ends.

If a sticking detection signal is not received before the sticking detection period is over at Step S202, the second sticking detection unit 43 determines whether or not the voltage value of the sticking detection voltage monitored since the start of the sticking detection operation has dropped below the threshold within the sticking detection period (S205). If the voltage value has not dropped below the threshold, the second sticking detection unit 43 determines the "absence of sticking". Upon the second sticking detection unit 43 determining the "absence of sticking", the robot controller 4 transmits, by means of the motion command unit 42, a signal indicating termination of the sticking detection operation (sticking detection operation command: OFF) to the welding power supply 3 (S206).

Thereafter, the robot controller 4 outputs, by means of the motion command unit 42, a robot motion command signal to cause the arc welding robot 2 to transition to a next welding motion (S207). Thereafter, the sticking detection operation by the second sticking detection unit 43 ends.

If the voltage value has dropped below the threshold within the sticking detection period at Step S205, that is, if a change in the voltage value indicates the occurrence of sticking, the operation advances to a process at Step S203. That is, even without the sticking detection signal received from the first sticking detection unit 32 within the sticking detection period, the second sticking detection unit 43 determines the "presence of sticking" and terminates the sticking detection operation as in the case where the sticking detection signal has been received within the sticking detection period at Step S202.

Since the second sticking detection unit 43 monitors the voltage value independently from the first sticking detection unit 32 as described above, the second sticking detection unit 43 is able to detect the "presence of sticking" even if the sticking detection signal indicating the presence of sticking is not received from the first sticking detection unit 32, that is, even if the result of the detection by the first sticking detection unit 32 indicates the absence of sticking. According to the arc welding robot system 1 including the sticking detection device 5, therefore, it is possible to determine the presence or absence of sticking even if a failure that prevents the sticking detection signal from being successfully transmitted to the first sticking detection unit 32 occurs while the system is in operation, for example. Thus, it is possible to determine the presence or absence of sticking of the welding wire 26 to the workpiece 100 more reliably in arc welding.

Furthermore, since the second sticking detection unit 43 determines the "presence of sticking" whenever the second sticking detection unit 43 receives the sticking detection signal indicating the presence of sticking from the first sticking detection unit 32, the robot controller 4 is able to swiftly terminate the robot motion. Thus, it is possible to reliably avoid the risk of damaging the welding torch 25.

EXPLANATION OF REFERENCE NUMERALS

1: Arc welding robot system
2: Arc welding robot
3: Welding power supply
4: Robot controller
5: Sticking detection device
26: Welding wire
32: First sticking detection unit
43: Second sticking detection unit
100: Workpiece

What is claimed is:

1. A sticking detection device for detecting a presence or absence of sticking of a welding wire disposed in an arc welding robot to a workpiece, the sticking detection device comprising:

a first sticking detection circuit configured to detect the presence or absence of sticking based on a voltage value detected with respect to voltage being applied to the welding wire and the workpiece; and a second sticking detection circuit configured to determine the presence or absence of sticking based on the voltage value and a result of the detection by the first sticking detection circuit, wherein the second sticking detection circuit determines the presence of sticking if the result of the detection by the first sticking detection circuit indicates the presence of sticking, and the second sticking detection circuit determines the presence of sticking if the result of the detection by the first sticking detection circuit indicates the absence of sticking and the second sticking detection circuit detects a drop in the voltage value below a threshold.

2. A sticking detection device for detecting a presence or absence of sticking of a welding wire disposed in an arc welding robot to a workpiece, the sticking detection device comprising:

a first sticking detection circuit configured to detect the presence or absence of sticking based on a voltage value detected with respect to voltage being applied to the welding wire and the workpiece; and a second sticking detection circuit configured to determine the presence or absence of sticking based on the voltage value and a result of the detection by the first sticking detection circuit, wherein the second sticking detection circuit determines the presence of sticking if the result of the detection by the first sticking detection circuit indicates the presence of sticking and the second sticking detection circuit detects a drop in the voltage value below a threshold, and determines an occurrence of an error if the result of the detection by the first sticking detection circuit indicates the presence of sticking and the second sticking detection circuit detects no drop in the voltage value below the threshold or if the result of the detection by the first sticking detection circuit indicates the absence of sticking and the second sticking detection circuit detects a drop in the voltage value below the threshold.

3. An arc welding robot system comprising:

an arc welding robot having a welding wire;

a robot controller configured to control the arc welding robot;

a welding power supply configured to apply voltage between the welding wire and a workpiece; and a sticking detection device configured to detect a presence or absence of sticking of the welding wire to the workpiece, the sticking detection device having a first sticking detection circuit configured to detect the presence or absence of sticking based on a voltage value detected with respect to the voltage being applied to the welding wire and the workpiece, and a second sticking detection circuit configured to determine the presence or absence of sticking based on the voltage value and a result of the detection by the first sticking detection circuit, wherein the first sticking detection circuit is provided in the welding power supply, and the second sticking detection circuit is provided in the robot controller.

4. The arc welding robot system according to claim 3, wherein the second sticking detection circuit determines the presence of sticking if the result of the detection by the first sticking detection circuit indicates the presence of sticking, and determines the presence of sticking if the result of the detection by the first sticking detection circuit indicates the absence of sticking and the second sticking detection circuit detects a drop in the voltage value below a threshold.

5. The arc welding robot system according to claim 3, wherein the second sticking detection circuit determines the presence of sticking if the result of the detection by the first sticking detection circuit indicates the presence of sticking and the second sticking detection circuit detects a drop in the voltage value below a threshold, and determines an occurrence of an error if the result of the detection by the first sticking detection circuit indicates the presence of sticking and the second sticking detection circuit detects no drop in the voltage value below the threshold or if the result of the detection by the first sticking detection circuit indicates the absence of sticking and the second sticking detection circuit detects a drop in the voltage value below the threshold.

* * * * *